June 13, 1939.   M. EWALD   2,161,806
BOBBING DEVICE
Original Filed July 11, 1932   3 Sheets-Sheet 2

Inventor:
Mark Ewald

June 13, 1939.  M. EWALD  2,161,806
BOBBING DEVICE
Original Filed July 11, 1932   3 Sheets-Sheet 3

Inventor:
Mark Ewald

Patented June 13, 1939

2,161,806

UNITED STATES PATENT OFFICE 2,161,806

BOBBING DEVICE

Mark Ewald, Olympia, Wash., assignor to Special Equipment Company, Portland, Oreg., a corporation of Oregon Application July 11, 1932, Serial No. 621,857
Renewed April 28, 1938

47 Claims. (Cl. 146—81)

This invention has to do with a machine for the preparing of a fruit for canning and relates in particular to a device adapted to sever the stem end from a pear or other fruit.

The present invention relates to an automatic machine for preparing fruit for canning or preserving, and particularly to a mchine for automatically bobbing or severing the stem end of a pear in an automatic manner. The present invention is used as a part of a continuous, automatic machine which performs a number of operations upon a pear fed into such machine, wherein the bobbing of a succession of pears as they pass through the machine is carried out in an automatic, expeditious manner in such a way that the stem of the pear, preferably with a small portion or section of the flesh of the neck of the pear, is severed from the pear body proper by a clean cut, which is preferably formed transversely of the stem axis of the pear whereby to preserve the symmetry and fine appearance of the pear as an ultimate peeled and finished article suitable for canning.

In the handling of pears it is very important that the pears be expeditiously and economically handled and cut to remove the stems, blossoms, peeling and core in such a manner as not to interfere with the fine appearance of the fruit, nor to affect its sale value. Inasmuch as pears are graded according to appearance, size, shape and firmness, which grades vary considerably in price or value, any operation by an automatic machine which detracts from the value of the fruit is commercially objectionable.

Hence one of the objects of the present invention is to provide a stemming or bobbing machine fully automatic in its operation, wherein the pears fed into the automatic machine will be carried to the bobbing station in an automatic manner, will be held firmly during the stem severing operation, and will be held firmly not only at the enlarged body portion but also at the neck portion of the pear, and particularly adjacent the plane of severance through the neck portion for cutting off the stem so as to prevent tilting or movement of the pear during the severing operation with a consequent impaired line of severance; and wherein the means for so holding the pear during the cutting operation will automatically permit pears of varying sizes and varying shapes, particularly neck sizes, to be automatically and continuously handled in a practical flowing stream of pears as they pass through the machine.

Another object of the invention is to provide an automatic machine, operating in a practically continuous manner, for severing or bobbing the stems from pears, wherein the cutting of the stems in a plane substantially transverse to the stem axis of the pear is assured, and wherein the cutting is performed while the enlarged body portion of the pear is firmly held and while the neck of the pear adjacent the plane of severance is firmly held and in such a manner that the stem of the pear projects freely, naturally and unobstructedly outwardly during the severing operation, so that the stem will not interfere with the severing operation.

Yet another object of the invention is to provide an automatic machine for bobbing a succession of pears in a practically continuous flow, wherein gauging means is provided in connection with the severing mechanism so that in bobbing pears wherein the enlarged portion of blossom end of the pear varies considerably and wherein the neck portion of each pear of maximum diameter may vary considerably in shape and size, I have provided the gauging mechanism to cooperate with the neck of a pear and the bobbing mechanism so that a substantially uniform portion of the flesh of the neck of the pear together with the stem will be severed from the pear on a line extending transversely through the stem axis of the pear.

Yet another object of my invention is to provide gauging mechanism of the above character which will, when gauging the pear for the severing operation, permit the stem to extend beyond the neck of the pear during severance in an unobstructed manner whereby to eliminate any possibility of the stem, during the gauging and/or cutting operation, being bent backwardly or pushed backwardly into the flesh of the pear neck and thereby obstruct, impede, or impair the bobbing operation and the consequent appearance of the pear.

Yet another object of my invention resides in providing an automatic machine for paring a succession of pears for canning, which machine includes a plurality of successive stations together with a plurality of successively operating, spaced apart holding means for the pears which will transport the pears from station to station, and wherein an intermediate one of the successive stations comprises the bobbing or stem severing station, and wherein the holding means for the pears comprises in one instance complementary members adapted firmly to hold the enlarged portion of the pear and also the neck portion of the pear adjacent the line of severance, at the bobbing station, and wherein, subsequent to the bobbing station, the pear is held by only one of the holding means, specifically that holding means only which holds the enlarged portion of the pear whereby the pear thus held may be readily released to other instrumentalities automatically operating thereon.

Yet another object of my invention resides in providing in combination with the bobbing device of an automatic pear operating machine, complemental holders for the pear, one adapted to engage the fleshy enlarged portion of the pear and the other adapted to engage the fleshy neck portion of the pear adjacent the line of severance to be formed, wherein said complemental holding means are automatically shifted relatively toward each other in a direction parallel to the stem axis of the pear whereby to firmly hold the pear, and particularly the neck portion of the pear, during the bobbing operation and whereby said holding means will automatically accommodate pears of varying sizes and shapes.

Another object of the invention is to provide an automatic bobbing device for pears adapted to sever a uniform segment from the neck end of a succession of pears which are not uniform in size.

Another object of the invention is to provide a bobbing device which preferably moves axially to and from the operating range of the pear.

Yet another object of my invention resides in providing a bobbing device for operation in conjunction with fruit feeding mechanism which has intermittent motion, and which bobbing device is preferably adapted to be moved into operating range of said mechanism intermediate the shafts of said mechanism and to retract before motion is again imparted to said mechanism.

After the stem bearing end of the fruit has been cut or "bobbed", the pear holding means carrying the fruit is advanced to a succeeding station to be engaged by other machine parts. Simultaneously or immediately thereafter another holding means with fruit arrives at the station where the bobbing occurs, so the operation of the device is substantially continuous.

With these and other desirable objects in view, the description of the invention is hereinafter set forth with reference to the accompanying drawings hereby made a part of this specification, and in which.

Like reference characters are used throughout the following description and in the drawings which will be better understood when read in conjunction with such description.

Figure 1:
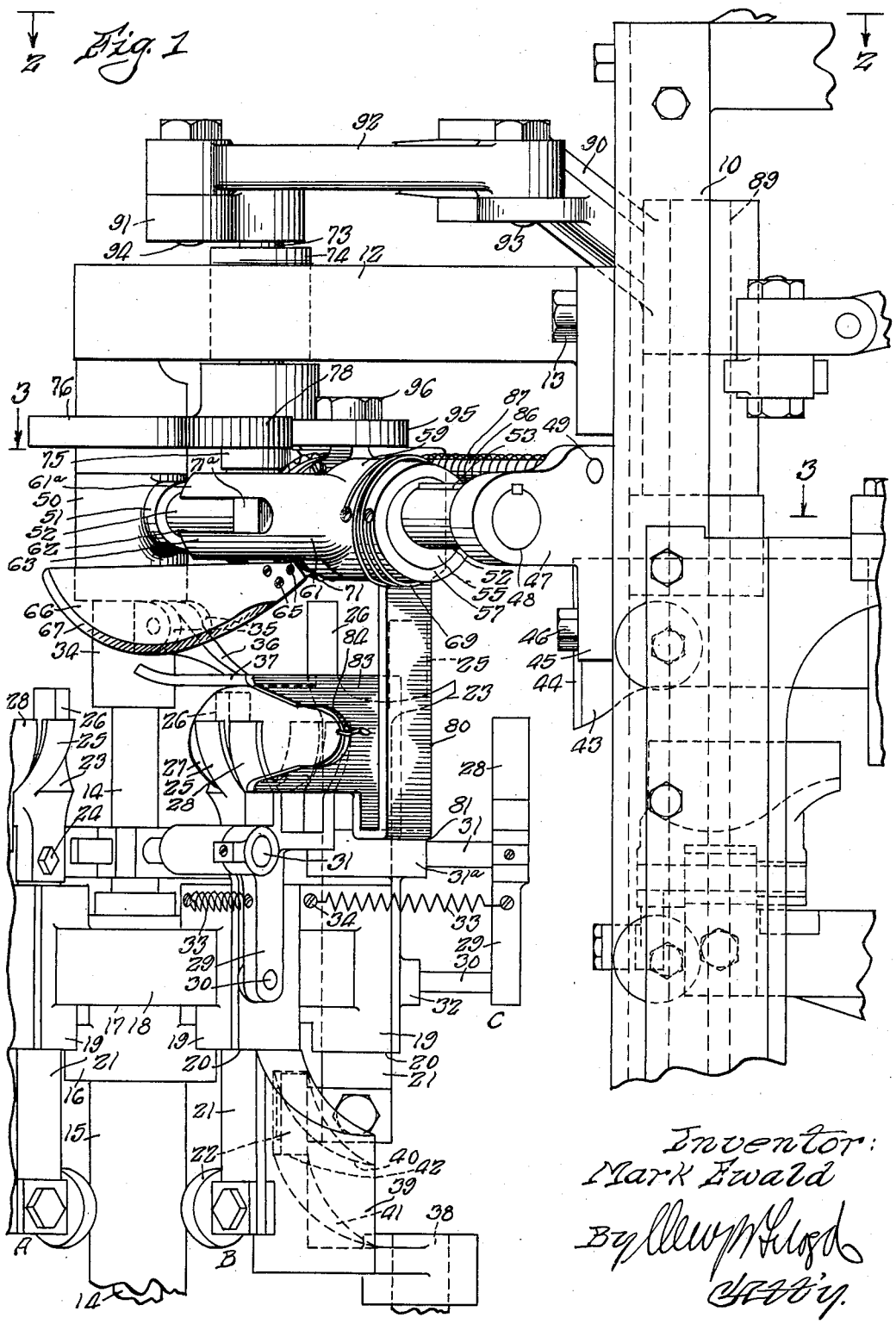
Figure 1 is a perspective view of the present invention illustrating its assembly with associated parts of a pear treating machine.

While in the present specification I have shown my bobbing mechanism as in combination with and cooperating with a machine of the general characteristics heretofore disclosed and claimed in patents heretofore granted and/or pending applications of the same general character (my Patent No. 1,989,090, January 29, 1935, being a fair example), it is to be understood that my bobbing mechanism may be equally operative in an automatic machine of construction and operation different from that so disclosed in said patents and applications. This is particularly true of the means for holding the fruit which, in the present invention, may be of any desired construction to carry out the functions of my present disclosure. However, for purposes of convenience and illustration, I prefer to disclose it in conjunction with the type of machine disclosed in the drawings.

A brief description of the parts operating in connection with the present embodiment of the invention will first be given. In Figure 1 are shown those parts which operate preferably in connection with the present invention. The pear treating machine comprises a frame with uprights 10. Two of the legs or uprights 10 and a cross bar 11 at the top of the frame for the machine are shown from above in Figures 2 and 3. Extending to the front of the machine frame comprising the members 10 and 11, is a trapezoidal member 12 which is secured to the frame by means of bolts 13. Hereinafter the terms "right" and "left" will be taken with reference to the machine as viewed from the front side of the machine. Rotatively placed upon the rod 14 is an elongated sleeve 15, and to the top of the sleeve 15 is fixedly secured a hub 16 of a turret 17 so that the latter may rotate with the sleeve 15. The turret 17 embodies a peripheral strip 18 in which at regular intervals are placed blocks 19 having vertical bearings 20 therein. Stems 21 are reciprocally mounted within the bearings 20 and have upon their lower extremities rollers 22 for movement about a horizontal axis intersecting the vertical axis of the rod 14. A pear holding means herein specifically shown in the form of a feed cup 23 is secured upon the upper end of each of the stems 21 by means of suitable apertures and bolts. Side members 25 and a back member 26 extend upwardly from the bottom of the cup in which a pear 27 may be seated.

Coacting with the side members 25 of the cups are complementary cup members 28 which are mounted upon the top of a stem 29. The latter named member 29 has rod-like pieces 30 and 31 projecting therefrom inwardly of the turret and reciprocally contained within bearings 31a and 32. A spring 33 is attached to each of the stems 29 and to a suitable anchorage 33a upon the turret for constantly urging the stems 30 and 31 and the fingers 28 inwardly of the turret and adjacent to their respective cups 23.

To the bottom of the sleeve 15 is attached means (not shown) for imparting intermittent rotative motion to the sleeve and to the turret 17. There is about the periphery of the turret 17 as many stations as there are feed cups. Stations A, B, and C are shown in Figure 1. The means for imparting the motion to the turret 17 rotates it in an anti-clockwise direction and to the extent necessary to advance each pear holding means to registry with the next succeeding station.

The pear is contactingly fed, positioned, or supported by the pear holding means at any station succeeding station C up to and including station A, and with the stem end of the fruit projecting outwardly of the turret. The pear is thus held with its stem axis extending in a predetermined direction, to wit, outwardly of the turret so that as the turret moves, the position of the stem axis, the neck of the pear and the projecting stem will be predetermined for the automatic and subsequent bobbing operation. A subsequent movement of the turret will then advance the fruit which has been placed within the cup while at station A to station B where the fruit is detained for a short period before the next movement is imparted to the turret. It is at station B where the present bobbing device performs its operation upon the fruit. Posterior to the bobbing operation at station B, the fruit is advanced to station C by an intermittent movement of the turret 17 and where the fruit cup is elevated so that it may be engaged by other instrumentalities (not shown) for abducting the fruit from the cup 23 and for carrying it inwardly of the paring machine where it is further treated.

When a fruit is placed within a feed cup, the cup parts 28 are drawn inwardly to contact the fruit between such parts and the parts 25 and 26 of the cup and to positively hold the fruit in a selected position. The parts 28 are allowed to retain the inwardly displaced position, due to the urge of a spring 33, at all stations excepting station C. In addition to the contacting grasp of the fruit by the parts comprising the cup walls, there is at station B means for still further insuring a fixed position of the fruit within a cup. Stationed upon the rod 14 is a sleeve 34 having apertured ears 35 projecting radially therefrom. Intermediate the ears 35, and by means of the apertures therein, is pintled a stem 36 having at the end thereof a plate 37. One end of the plate 37 is turned up so that fruit being brought theretoward will raise the plate as it is passed thereunder. The weight of the plate 37 assists in the maintenance of a fruit in a desired position within the cup at station B.

After the operation of the present device at station B and as the cup 23 is advanced to station C, a stationary cam (not shown) disposed upon the staff 14 engages the inner end of the rod 31 to force the members 28 away from the cup members 25 and 26 to release the engagement of the pear. This mechanism is disclosed specifically in my pending application Serial No. 621,914. The pear 27 also passes from beneath the plate 37 so that upon arriving at station C, it is wholly released and resting within the seat of the cup 23 so that there will be no difficulty encountered by a device (not shown) for lifting the fruit from the cup to carry it inwardly of the machine. The device for lifting the fruit from the cup to carry it inwardly of the machine is specifically disclosed and claimed in my pending application Serial No. 621,914. Thus, after the bobbing operation the pear is no longer held by both the enlarged portion of the pear and the neck portion, but is held only at the enlarged portion of the pear and in such a manner that the pear may be readily released or operated upon by subsequent instrumentalities during the continuous processing of the fruit.

In the lower part of Figure 1 is shown a shaft 38 upon which is mounted a cam plate 39. The plate 39 is arcuate with its arcuate wall generated about the vertical axis within the shaft 38. A roller race 40 is cut within the inner face of the arcuate wall 39, the bottom 41 of said race being raised at the center to form an apex 42 and to decline uniformly on either side of said apex. After the cup 23 has reached the station C, an end of the bottom 41 of the race 40 which is being rotated uniformly with the shaft 38, engages the bottom of the roller 22 to pass thereunder and to concurrently elevate the roller and the stem 21. This act elevates the cup 23 upon the upper end of the stem to a position where the released fruit may be engaged by the hereinabove mentioned abducting device (not shown). Concurrently with the carrying of the fruit inwardly of the machine, the device for conveying the fruit brings such fruit into contact with a blade 43 having a vertical cutting edge 44. The fruit is caused to pass the blade axially through the center of the fruit to divide it into two parts. This operation is described and claimed in detail in a co-pending application for letters patent entitled Feeding mechanism, Serial No. 621,914 filed July 11, 1932.

With the above described parts in mind, the present device, which is herein shown for the purposes of convenience and illustration but not by way of limitation as for co-ordinated operation, will now be described. Suspended from the right frame member 10 is a bracket 45 secured thereto by bolts 46. The anchored portion of the bracket 45 extends to the right of the machine where it embodies an angular portion 47.

Within the portion 47 are apertures 48 and 49. Fixedly secured to the rod 14 above the sleeve 34 is a sleeve 50 which provides a socket 51 coacting with the aperture 48 for supporting a rod 52. Upon the upper side of the rod 52 is a spline 53 which extends from within the wall of the aperture 48 toward the support of the rod 52 within the socket 51.

Longitudinal movement of the rod 52 is precluded by a set screw 54 within the bracket 45. Reciprocally disposed upon the rod 52 is a sleeve 55 having a groove therein for receiving the spline 53, the latter preventing the sleeve from rotating about the rod. At the left end of the sleeve 55 is a flange 56, and at the opposite end of said sleeve is secured a collar 57 by means of a set screw 58. Rotatively mounted upon the sleeve 55 is a shank 59 of a bracket 60. Projecting from the shank is a bifurcated member 61, there being a slot 62 between the divided parts 61a and 63.

From the lower of the two members forming the fork 61 projects a lug 64 to which is secured by means of rivets 65 a blade 66 possessing a sharpened edge 67. A coiled spring 69 having an end secured to the collar 57 by screw 68 has its opposite end attached to the shank 59 by a screw 70. The spring 69 at all times urges the shank 59, and hence the blade 66, in a clockwise direction as viewed from the end of the rod 52 anchored within the bracket 45.

Figure 4:
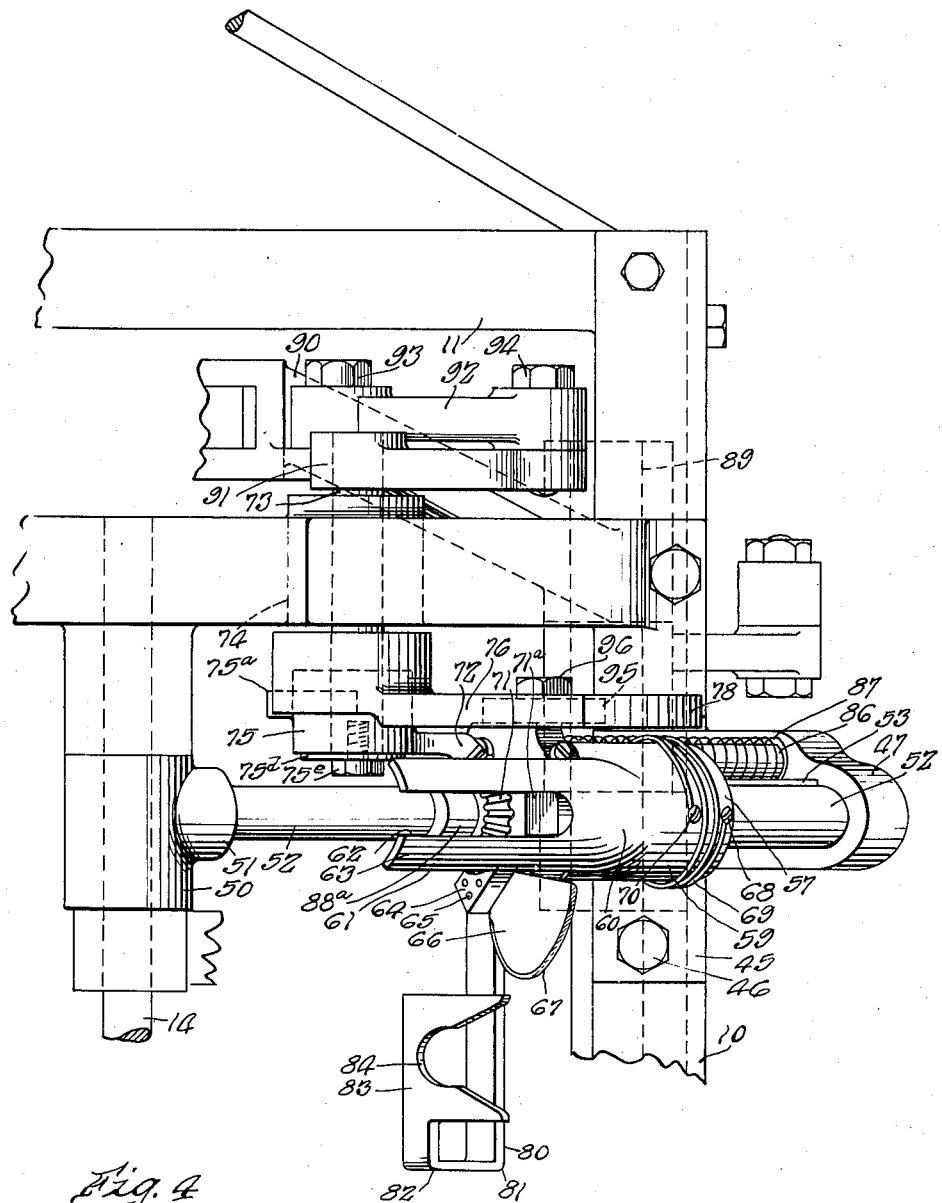
Figure 4 is a perspective view of the device taken in elevation.

Rotatively mounted upon the rod 52 is a bevel gear 71 for engaging a gear segment 72 disposed to rotate about a shaft 73. Shaft 73 is journaled within one of the members of the trapezoidal piece 12 and within a bearing 74. The gear 72 projects from short sleeve 75 extending upwardly therefrom. A lug 75a projects from the sleeve 75 into a slot 75b in the lower edge of a sleeve 75c projecting upwardly from a cam plate 76. Figure 4 shows the way in which the sleeves 75 and 75c are arranged to one another. Sleeve 75 is free to rotate about the shaft 73 and is supported at the bottom end thereof by means of a washer 75d and a machine bolt 75e. The plate 76 which is disposed within a horizontal plane has an arcuate edge 77 enjoining an irregular edge 78. The sleeve 75c is fastened to the shaft 73 so that the cam 76 is made to rotate with the shaft. There is free movement between the shaft 73 and the sleeve 75 as limited by the amount of play of the lug 75a between the two sides of the slot 75b. Lug 75a is actuated by sleeve 75c.

Depending downwardly from the flange 56 is a bracket 80 which is bent or shaped at 81 and 82 to provide an off-set portion 83 within a vertical plane tangential to an arc generated about the vertical axis of the rod 14. This offset portion 83 and its operating mechanism constitutes complemental pear holding means and also constitutes fruit gauging means. A slot 84 is contained within the piece 83 and opens to the right edge of the piece. Also, within the flange 56 is an aperture 85 for loosely containing an end of a rod 86. Upon the rod 86 is an expansion spring 87. The spring 87 presses against the right face of the flange 56 to continually urge the sleeve 55 and the parts appended thereto to the left, the limit being determined by collar 88 intermediate the said flange and the pinion 71.

Movement of the pinion 71 to the left along the rod 52 is prevented by a collar 88a secured to the rod 52 by a set screw 88b.

A vertical shaft 89 disposed within the angle of the right frame upright 10 provides for the actuation of the present device. Keyed to the upper extremity of the shaft 89 is an arm 90. The end of the arm 90 extending to the left is connected to the end of an arm 91 by means of a link 92. Arm 91 is in turn keyed to the shaft 73 by a key 91a. The link 92 pivotally engages the ends of the arm 90 and of the arm 91 by means of pins 93 and 94 respectively. Movement is imparted to the shaft 89 from the same source of power from which the turret 17 receives power for turning the latter named member intermittently.

There is a definite fixed time relation between the movements imparted to the shaft 89 and to the turret. Immediately a cup 23 arrives at station B with the fruit therein and held in the manner hereabove described, the spring 87 urges the sleeve 55 carrying the combined gauge and pear holder and also the knife carrying member 61, and hence the bracket 80, and the blade 66 to the left to bring the side of the slot 84 into engagement with the flesh of the neck of the fruit 27. Fruit which is fed to the feed cups has been previously graded to an approximately uniform size. The movement of the parts to the left is limited by the engagement of the sides of the slot 84 with the extended flesh of the neck of the fruit.

A bracket 80 is selected for the specific grade or size of fruit which is being treated by the machine. The size of the fruit determines how far the complemental cutting means 83 may be advanced before being stopped by the engagement of the slot 84 with the flesh of the neck of the fruit, and a slot 84 is selected of such a size that a desired uniform segment or portion of the neck of the pear will project therethrough when the movement of the bracket 80 is stopped. After the slot 84 is placed about the flesh of the neck of the fruit with a portion of the latter extending therethrough, a counter-clockwise movement of the shaft 89 and the arm 90, through the agency of the link 92, causes the shaft 73 and the segmental gear 72 to turn in a clockwise direction, imparting a counter-clockwise movement to the gear 71 and the blade 66 as viewed from the right. A lug 71a projecting from the shoulder of the pinion 71 is the operating connection between the pinion 71 and the bracket 60. Since the lug 71a is freely movable longitudinally within the slot 62 the pinion can turn the bracket 60 therewith whether the sleeve 55 be at the right or left extremity of its reciprocating field.

The blade 66 is of a length to pass alongside of the slot 84 in a plane parallel thereto and at right angles to the stem axis and between the member 83 and the stem proper. The pear is held within the slot 84 very closely to the section where the blade 66 is passed therethrough, so that there is little likelihood of the pear being shifted from its position within the feed cup. It will thus be seen that during the bobbing operation the pear is firmly held not only at the enlarged portion thereof by suitably formed pear holding means, but is likewise held firmly by contact with the flesh of the neck of the pear at adjacent the desired plane of severance of the bobbing means, whereby tilting or movement of the pear is eliminated and in such a manner that the plane of severance of the cutting mechanism will uniformly be made transversely of the stem axis. In addition, it will be noted that during the bobbing operation the stem of the pear extends at all times freely, unobstructedly, and naturally outwardly from the pear and is not contacted by any mechanism or part which will tend to force the stem inwardly or reentrantly into the flesh of the pear in a manner to disturb the bobbing operation, tilt the pear in the holding means, or affect the clean cut and transverse line of severance. In addition, it will be noted that the complemental holding means for the pear automatically shift relatively toward each other and in a direction parallel with the stem axis of the pear, whereby firmly to hold fruit not only of varying sizes with respect to the maximum diameter, which is the enlarged part or body of the fruit, but also to accommodate fruit of varying neck sizes and shapes. After the blade 66 has passed through the fruit, the shaft 89 is given a turn in the opposite direction to retract the movement of the blade 66 and of the cam plate 76. Continued movement of the shaft 89 in a clockwise direction carries the edge 78 of the cam 76 into engagement with the side of a roller 95 mounted within the top of the flange 56 by means of a bolt 96.

The passing of the edge 78 along the side of the roller 95 displaces the sleeve 55 and hence the bracket 60 to the right along the rod 52. As the parts are moved to the right along the rod 52, the rod 86 projects further through the aperture 85 within the flange 56 and compresses the spring 87.

Figure 2:
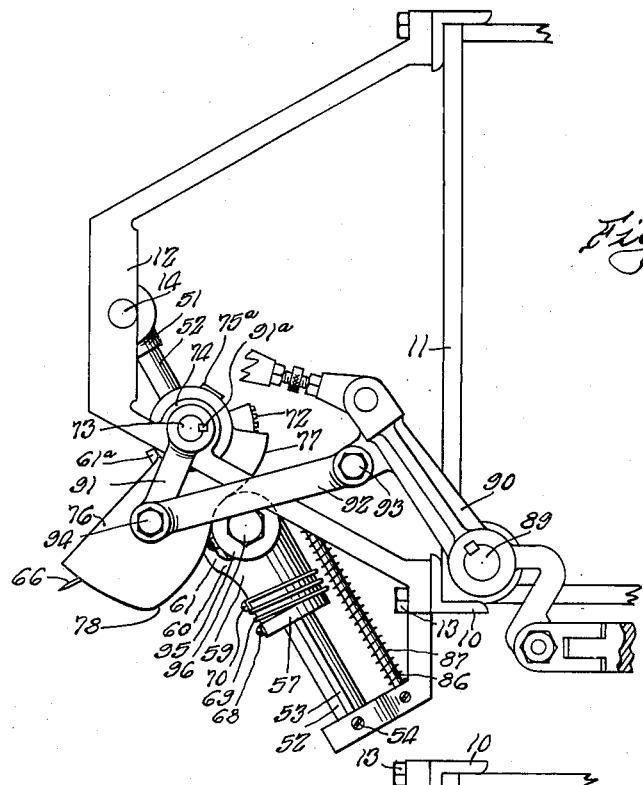
Figure 2 is a sectional plan view of the device as taken along the line 2—2 of Figure 1.
Figure 3:
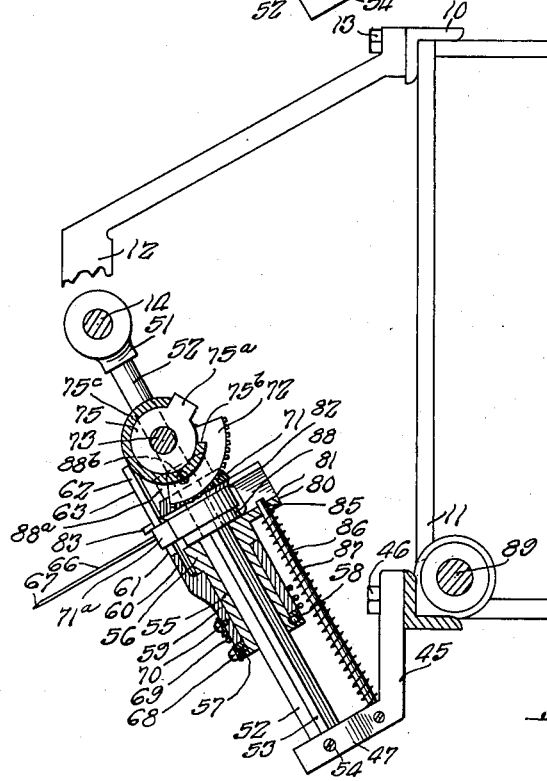
Figure 3 is a horizontal section taken through the device as indicated by the line 3—3 of Figure 1.

There is a definite cooperation during operation of the device between the slot 75b and the spring 69 which will now be described. When the cam plate 76 and the sleeve 75c are turned in a clockwise direction to permit the sleeve 55 and the appendages thereto to be shifted to the left under the impinging effect of the spring 87, and thereby position the gauge and holding means into contact with the neck of the pear, the left side of the notch 75b (as seen from the front of the machine in Figure 3) does not engage the lug 75a until the roller 95 has traversed the camming edge 78 and the reciprocable carriage comprising the sleeve 55 is farthest to the left, as shown in Figure 2, and therefore in gauging and fruit holding position. Therefore, up to this time the segmental gear 72 has not been rotated, nor has the blade 66 been rotated. It is essential that the blade 66 does not rotate concurrently with its movement to the left, otherwise it would not be in a position for cutting the end from the pear when arriving adjacent thereto. In fact, if the blade had already been rotated when it reached the fruit, the side thereof would collide with the fruit and the operation intended would be frustrated. It is the purpose of the spring 69 to retain the blade 66 in the horizontal position against the gravitational urge tending to drop the blade in a position covering the slot 84. It is after the gauge and fruit holding means 83 has been moved into engagement with the fruit that the left side of the notch 75b presses against the lug 75a to rotate the pinion 71 and the blade 66.

Subsequent to the cutting stroke of the blade 66 and while the cam plate 76 is being counter-revolved with the arcuate edge 77 opposed to the roller 95, and hence before the bracket 80 is moved to the right, the said left edge of the notch 75b is withdrawn counterclockwise. The spring 69 may then cause the gears 71 and 72 and the blade 66 to be rotated to their normal position preparatory for another cutting stroke and before the carriage is moved to the right by the roller 95 being displaced along the cam edge 78.

Sliding movement of the blade 66 along the severed face of the fruit and to the normal horizontal position is had with very little frictional engagement with that face and there is no tendency to disturb the position of the fruit as held within the feed cup. However, if the blade were not so displaced by spring 69 from the fruit before its movement to the right with the gauge, the blade would be lifted flatly from the contiguous severed face and the vacuum between that face and the blade would cause an appreciable affinity between the two and a possibility of unseating the fruit from the cup.

After the parts which are reciprocally mounted upon the rod 52, including the blade 66 and the section 83 of the bracket 80, have been removed from the pear whose end has been cut therefrom, the turret is given a movement to advance each feed cup thereon to the succeeding station. The parts of the bobbing device at this time have been retracted from the turret so that there will be no interference in its operation. When a new fruit is carried to station B, a counter-clockwise movement is again imparted to the shaft 89 to remove the cam plate 76 from the roller 95 and to allow said roller to pass along the edge 78 of the cam plate as urged by the compression spring 87. Usually the arcuate edge 77 of the cam plate 76 will not be reached by the roller 95. This is because the movement of the sleeve 55 along the rod 52 is normally stopped by the engagement of the side of the notch 84 with the fruit at station B. Thus, it is the fruit which determines the distance which the sleeve 55 moves to the left upon the rod 52 so that there will be a segment severed from the end of the fruit uniform in size, and at right angles to the stem axis to produce a symmetrically shaped and cut pear.

In the following claims I have recited the holding means for the enlarged part of the pear as "cup" or "receptacle". It is to be understood, however, that such terms are to be interpreted as defining any type of means for firmly engaging the flesh of the enlarged portion of the pear for holding and transporting the pear.

What is claimed as new and is desired to be secured by Letters Patent of the United States is:

1. The combination with a cup having an axis corresponding to the axis of a pear therein, of a bobbing device comprising a support, a knife on said support, gauge means also on said support and removed from said knife a predetermined distance for selectively positioning said knife with respect to such pear in said cup, means for moving said bobbing device in parallelism with the axis of such pear, and means for moving said knife independently of said gauge means and transversely of the axis of such pear, said gauge means being adapted to engage a section of a pear of predetermined diameter when moved longitudinally thereof, and the means for moving said knife independently of said gauge means being operative when said gauge means has engaged a pear.

2. The combination with a fruit cup having an axis coincident with the axis of a fruit therein, of bobbing means comprising a knife, means movable axially of said cup for gauging said knife relatively to a section of predetermined diameter of such fruit in said cup, resilient means for urging said gauge means toward said cup, means for moving said knife transversely of the path of movement of said gauge means, the pear in said cup acting as a stop means upon engagement of said gauge means therewith to prevent further movement of the gauge under the urge of the gauge actuating means, and means for actuating said knife moving means after said gauge moving means has engaged such fruit.

3. The combination with a fruit cup having an axis coinciding with the axis of the fruit therein, of a bobbing device reciprocable toward said cup in a path parallel to the axis of the latter, said device comprising gauge means disposed axially of said cup for engaging a section of a fruit in said cup, such fruit acting as a stop means to limit the reciprocation of said device, a blade movable transversely of the path of reciprocation of said device for severing an end portion of the engaged fruit and spaced from the fruit engaging member, means for reciprocating said device, and means actuating said blade in timed relation with the reciprocation of said device for moving said blade through the end of such fruit while said gauge means is in engagement therewith.

4. The combination with a fruit cup having an axis coinciding with the axis of a fruit therein, of a bobbing device movable in a path parallel to the axis of a fruit in said cup and comprising gauge means concentric with such fruit and movable with said bobbing device for engaging such fruit at a selected section, a blade in juxtaposition to said gauge means and movable transversely of the axis of the fruit in said cup for severing an end portion therefrom, means for moving said device, and means operating said blade in timed relation with said device moving means for forcing said blade through such fruit while said gauge means is in engagement with the fruit.

5. In a pear treating device, a fruit receptacle having an axis coincident with the axis of a pear therein, a bobbing device movable axially of the pear in said receptacle and comprising a gauge member for engaging such fruit at a section of predetermined diameter, means for moving said device, engagement of said gauge means with a pear in said receptacle arresting the movement of said device, a blade on said device and spaced from said gauge member, and means for causing relative movement between said receptacle and said blade transversely of the axis of such pear while the pear is engaged by said gauge member whereby to sever an end section from such pear.

6. In a pear treating device, a fruit receptacle having an axis coincident with the axis of a pear therein, a bobbing device reciprocable in a path parallel to the axis of such pear in said receptacle and comprising a gauge member depending therefrom for engaging such pear at a section of selected diameter, an oscillatory member, a blade depending from said oscillatory member in spaced relationship to said gauge member axially of such pear, separate means for reciprocating said device in opposite directions, means for oscillating said member and said blade normally to the path of reciprocation of said device, engagement of a pear in said receptacle by said gauging member limiting the movement of said device by one of said reciprocating means, and means for synchronizing the movements of said oscillatory member and the reciprocation of said device whereby the blade is oscillated while said gauge member is in engagement with a pear and said device is retracted after the blade has passed through such pear.

7. In a pear treating device, a fruit receptacle, a bobbing device reciprocable axially of a fruit in said receptacle and comprising means yieldingly urging said device toward such fruit, gauge means extending from said device to engage such fruit at a section of predetermined diameter, such engagement determining the movement of said device, an oscillatory member, a blade extending from said oscillatory member and movable in a path transverse of the axis of the fruit in said cup, means for moving said device against the force of said urging means, means yieldingly urging said oscillatory member and said blade into an inoperative position, other means for moving said oscillatory member and blade from such inoperative position transversely of the axis in such fruit against the force of the second of said urging means, and means for timing the movements of said several means so that the cycle of their operation is movement of the device until said gauge member engages a fruit in said receptacle, movement of the oscillatory member and blade from their inoperative position while said fruit gauging member is engaging such fruit, the return of the oscillatory member and blade to their inoperative position, and the retraction of the device to its starting position.

8. Fruit bobbing apparatus comprising a series of cups having axes coinciding with the axes of fruit deposited therein, a carriage, a support on which said carriage is reciprocated in parallelism with the axes of one of said cups, gauge means and bobbing means in spaced apart relationship on said carriage and movable conjointly with said carriage, the bobbing means being also movable independently and normally of the movement of said gauge means, means for intermittently moving said cups to register one after another with said gauge means, and means for reciprocating said carriage and actuating said bobbing means normally of said gauge means during each of such registrations.

9. Pear bobbing apparatus comprising a cup having an axis corresponding with the axis of a pear deposited therein, a track in parallelism with the axis of said cup, a carriage on said track, means for reciprocating said carriage, gauge means on said carriage and contacting a predetermined section of a pear in said cup, a knife on said carriage and movable transversely of the movement of said carriage, and means for reciprocating said carriage and actuating said knife in a selected order.

10. The device described in claim 9, and in which said gauge means has a U-shaped opening adapted to partly encircle the stem end of such pear.

11. The device described in claim 9, and in which said gauge means has a U-shaped opening adapted to partly encircle the stem end of such pear, and said knife has a blade movable in parallelism with and in close proximity to said gauge, the cutting edge of said blade substantially closing the open side of said U-shaped opening anterior to entering the flesh of such pear.

12. Pear bobbing apparatus comprising a cup having an axis corresponding with the axis of a pear to be supported therein, a track in parallelism with the axis of said cup, a carriage on said track and having means for urging it in the direction of said cup, a gauge depending from said carriage and having its center in alinement with the axis of said cup, a knife on said carriage and movable normally of the axis of said cup, means for retracting said carriage, and means for moving said carriage toward a pear, actuating said knife, and retracting said carriage in timed relation.

13. Pear bobbing apparatus comprising a cup having an axis corresponding with the axis of a pear deposited therein, a track in parallelism with the axis of said cup, a carriage on said track, resilient means for urging said carriage toward said cup, gauge means on said carriage and contacting a predetermined section of a pear in said cup, a knife on said carriage and movable transversely of the movement of said carriage, means for retracting said carriage, and means for releasing said carriage, actuating said knife, and retracting said carriage in timed sequence.

14. A cup to receive a pear, and a support for said cup, in combination with a bobbing device comprising means for engaging a fruit in said cup, a track, means for moving said engaging means on said track axially of said cup and from a position removed from the end of said cup into engagement with a pear therein, a severing instrument also on said track, means for coupling said severing instrument for movement with said engaging means, mounting means for said severing instrument admitting of its movement transversely of the engaged end of the fruit in said cup independent of the movement of said engaging means, and a prime mover operable after the engaging means has contacted such pear for actuating said knife transversely of the engaged end of such pear.

15. A pear treating machine having a feed cup with an axis coinciding with the axis of a pear disposed therein, in combination with a reciprocally mounted bobbing device comprising a bifurcated member for engaging an end of a pear in said cup incident to movement of said device theretoward, means for moving said device when said bifurcated member is concentric of said feed cup, a blade in selected spaced relationship to said bifurcated member and movable transversely of the course of reciprocation of said device, and means for imparting movement to said blade while said member is in engagement with such pear.

16. Pear treating apparatus comprising a receptable for a pear and exposing the small end thereof, a support member movable relatively to said receptacle and axially of a fruit therein, a knife extending from and movable relatively to said support, a fruit abutting member extending from said support in parallelism with and at a fixed lateral distance from said knife, means for moving said support toward said receptacle to position said abutting member against the end of a fruit in said receptacle and thereafter retracting said support, and means for moving said knife transversely of its cutting edge through a fruit in said receptacle during engagement of such fruit by said abutting member.

17. A bobbin mechanism for cutting an end from a pear comprising holding means for such pear, gauge means movable axially of the pear and having a portion displaced laterally of the stem axis of the pear for engaging a section of the neck of the pear spaced from the stem end of the pear with the neck of the pear extending beyond said gauge in the direction of the stem axis, cutting means movable with said gauge and also movable in a direction normal to the movement of said gauge, common supporting means for said gauge and cutting mechanism, means for concurrently moving said gauge and said cutting instrument and for moving said cutting instrument normally to said gauge subsequent to the contact of said gauge with said pear.

18. In an automatic pear bobbing device in combination with means contacting the enlarged part of a pear to hold the same, neck severing means, additional means for engaging substantially diametrically opposite portions of the neck of a pear adjacent the base of the stem thereof, means for mounting said additional engaging means and said severing means whereby the plane of movement of said severing means is substantially parallel to the plane of the engaging means, means for moving said severing means across said engaging means in close proximity thereto, means for moving said bobbing device to position said engaging means into contact with the opposed portions of the neck of a pair, and means for thereafter actuating said severing means for movement in parallelism with said engaging means whereby a selected segment of flesh is severed from the neck of the pear.

19. A pear treating device comprising in combination a turret having a series of pear holding devices thereon adapted for holding a pear with the neck thereof exposed and extending outwardly from said holding means, means for moving said holding means one after another to a station, a support mounted at said station, a bobbing device on said support comprising means for engaging the exposed neck of a pear at said station, a cutting instrument adapted to have its cutting edge in close proximity to said engaging means and mounted on said support for movement in a plane parallel to the plane of said engaging means, means for positioning said bobbing device relatively to the pear holding means at such station with the engaging means in contact with the flesh of the neck of the extended pear and with the stem projecting therebeyond, and means actuating said cutting instrument in a plane parallel to said engaging means while the pear is engaged by the latter to sever a selected portion of the flesh of the neck of the pear and the stem therefrom.

20. An automatic pear bobbing device comprising movable pear holding means adapted to engage the enlarged part of the pear to hold the same with the stem axis in predetermined direction and with the stem exposed, complemental pear holding means having a portion spaced laterally of the stem axis of the pear adapted to engage the neck of the pear with the stem projecting therebeyond, means to cause relative movement between the pear holding means and the pear in a direction axially of the stem of the pear, means for severing the pear adjacent said complemental pear holding means, and means for moving the pear bodily away from the zone of action of the cutting means and away from the complemental pear holding means, said means comprising the first-mentioned pear holding means.

21. An automatic pear bobbing device comprising pear holding means adapted to engage the enlarged part of the pear to hold the same with the stem extending in predetermined direction, a second complemental pear holding means adapted to engage the neck of the pear at a portion thereof spaced from the base of the stem, means for severing the pear adjacent said second complemental pear holding means, means for automatically moving the first pear holding means to the severing means, and means for automatically and relatively moving said second complemental pear holding means in a direction axially of the pear stem axis.

22. An automatic pear bobbing device comprising a movable support having a plurality of spaced apart pear holding means thereon, each adapted to engage the enlarged part of the pear to hold the same with the stem axis of the pear in a predetermined direction, complemental pear holding means having a portion disposed laterally of the stem axis and adapted to engage the neck of the pear leaving the stem projecting freely therebeyond, means for automatically moving the support, pear severing means, means for automatically relatively moving said complemental pear holding means in a direction axially of the pear stem, and means for severing the pear adjacent said complemental pear holding means while held between said holding means whereby to sever the stem and a section of the flesh of the neck of the pear.

23. An automatic pear bobbing device comprising a movable turret having a pear holding means adapted to engage the enlarged part of the pear and to hold the same with the stem axis of the pear extending in predetermined direction, complemental pear holding means formed to engage the neck of the pear at a portion laterally spaced from the base of the stem, bobbing means, means for automatically moving the turret to the bobbing means, means for automatically and relatively moving said complemental pear holding means in a direction axially of the pear stem, said complemental pear holding means serving to position the pear relatively to the bobbing means whereby said pear will be held with its stem axis extending transversely to the plane of action of the bobbing means whereby said bobbing means severs a section of the flesh of the pear and the stem of the pear from the neck of the pear.

24. A bobbing device for pears comprising complemental pear holding means, one of said means firmly engaging and holding the enlarged portion of the pear with its stem extending in predetermined direction and another engaging the neck of the pear at a portion spaced from the base of its stem with the stem extending freely beyond the second said holding means, said second mentioned holding means being adjustably movable in a direction longitudinally to the pear stem axis and including means to permit said holding means firmly to hold pears of various sizes, means for cutting the neck of the pear closely adjacent to such second mentioned holding means to sever the stem, said second-mentioned holding means firmly holding the pear with its stem axis transverse to the plane of action of the cutting means at the zone of cutting and during the cutting operation, and means for bodily moving the cutting means in a direction parallel with the stem axis of the pear and to an extent corresponding to the extent of movement of the second mentioned holding means.

25. A bobbing device for pears comprising means engaging the flesh of the enlarged portion of the pear with the stem axis extending in a predetermined direction, and means adjustably movable variable distances of travel with respect to the stem axis of the pear and relatively to said first-mentioned means and including means engaging the flesh of the neck of the pear adjacent to but removed from the base of the stem whereby to leave the pear stem projecting naturally and unobstructedly from the pear, mechanical means for moving said adjustable means into engaging contact with the neck of the pear, means for cutting the flesh of the neck of the pear adjacent the second-mentioned holding means, and mechanical means for moving the cutting means to position it closely adjacent the adjusted position of the adjustable means.

26. A bobbing device for pears comprising a plurality of means adapted successively to engage solely the fleshy portions of a succession of pears, one of said means contacting the enlarged portion of a pear and holding the pear with its stem axis extending in a predetermined direction, and another of said means engaging the flesh of the neck of the pear with the stem projecting naturally, freely and unobstructedly from the pear, means for successively moving the second mentioned means variable distances of travel into contact with the necks of successive pears, and means for cutting the flesh of the neck of the pear adjacent the second-mentioned holding means including mechanism adjustably positioned by said adjusting movement of the second mentioned means for adjustably positioning the cutting means along the stem axis of the pears.

27. A bobbing device for pears comprising means for holding the enlarged part of the pear with its stem axis extending in predetermined direction relative to the plane of action of cutting means, gauging and neck supporting means engaging the flesh of the neck of the pear adjacent its stem with the stem extending freely therebeyond, means for cutting the neck of the pear adjacent the additional supporting and gauging means to sever a predetermined section of the flesh of the pear neck and the stem, and mechanical means for adjustably moving the cutting means to cut the pear neck at variable distances along the stem axis of the pear.

28. A bobbing device for pears comprising means for holding the enlarged part of the pear with its stem axis extending in predetermined direction relative to the plane of action of a cutting means, gauging and neck supporting means engaging the flesh of the neck of the pear adjacent its stem with the stem extending freely therebeyond, means for cutting the neck of the pear adjacent the additional supporting and gauging means to sever a predetermined section of the flesh of the pear neck and the stem, and means for moving the pear holding means and the gauging and neck supporting means relatively and in a direction parallel to the pear stem axis including mechanism connected to the cutting means to correspondingly position the cutting means relatively to the first mentioned pear holding means.

29. A bobbing mechanism for cutting an end from each of a succession of pears comprising a movable turret carrying a plurality of spaced holders, means for moving the turret to stationary position to position a holder at a bobbing station, each holder comprising means for holding a pear with its stem axis extending in a predetermined direction, gauge means adapted adjustably to contact the neck of each pear of the succession of pears with the end of the pear neck passing beyond said gauge means, means for adjustably moving the gauge means variant distances of travel determined by the contact of the gauge means with the particular sized neck of the pear, neck cutting means movable in the direction normal to the stem axis of the pear, means governed by the extent of movement of the gauge means for correspondingly moving the cutting means to position the cutting means closely adjacent the position occupied by the gauge means when contacting the neck of the pear, and means for causing the cutting means to bob the neck of the pear at said adjusted position of the cutting means.

30. A bobbing mechanism for cutting an end from a pear comprising holding means for the pear, gauge means, means for relatively moving the gauge means and the pear holding means in a direction parallel to the stem axis of the pear while the latter is so held, the gauge means including a pear contacting portion spaced laterally from the stem axis of the pear for engaging a portion of the pear neck spaced from the base of the stem of the pear, pear bobbing means movable with the gauge means and also movable in a direction normal to the movement of said gauge, and means for first positioning said gauge and bobbing means relatively to the neck of the pear and for then moving the bobbing means transversely of the stem axis of the pear.

31. A bobbing mechanism for bobbing a succession of pears, comprising a movable support having thereon spaced means for holding a succession of pears including mechanism for holding each pear with its neck and stem exposed and with the stem axis extending in a predetermined direction, gauging means adapted to successively contact the necks of the successive pears, means for successively moving the gauging means toward and from the holding means and in a direction along the stem axis of the successive pears to contact the necks thereof, the gauging means having a portion spaced a predetermined distance laterally of the stem axes of the successive pears while so held whereby variantly to engage the curved necks of the successive pears at different portions variantly spaced from the bases of the stems of such successive pears, bobbing means automatically positioned by said gauging means reatively to the necks of each of the successive pears, and means for automatically operating said bobbing means when so positioned to remove correspondingly variant portions from the necks of the successive pears.

32. A bobbing mechanism for pears comprising means for holding each of a succession of pears, said means being constructed and arranged to hold each of the pears with its stem axis extending in a predetermined direction, cutting means, means for moving the cutting means variant distances of travel in a direction parallel to the stem axis of the pear while so held, gauge means shiftable in a direction parallel to the stem axis of each of the pears while so held and having a portion removed laterally from the stem axis of the pear and adapted to engage the neck of the pear at a zone thereof removed from the base of the stem of the pear, means controlled by the positioning of said gauge means for determining the travel of the cutting means, and mechanism for moving the cutting means across the stem axis of the pear to sever the neck of the pear.

33. An automatic pear bobbing device comprising movable pear holding means adapted to engage the enlarged part of the pear to hold it with the stem axis extending in a predetermined direction and with the stem of the pear exposed, complemental pear holding means having a pear contacting portion disposed so as to contact the neck of the pear laterally or to one side of the stem axis of the pear leaving the stem projecting freely beyond said complemental pear holding means, means for automatically and relatively moving said pear holding means in a direction axially of the stem axis of the pear, means for severing the pear adjacent said complemental pear holding means, and means for moving the pear bodily away from the zone of action of the cutting means and away from the complemental pear holding means, said means comprising the first mentioned pear holding means.

34. In a bobbing machine for pears, the combination of means for firmly holding the enlarged portion of a pear with its stem axis extending in a predetermined direction, pear bobbing means, means for producing relative movement between the pear holding means and the bobbing means in a direction parallel to the stem axis of the pear, mechanical means for adjustably controlling the extent of relative movement between the bobbing means and the holding means to relatively position the bobbing means and the neck of the pear, and means for shifting the bobbing means to sever the neck of the pear when said bobbing means is so relatively and adjustably positioned.

35. In a bobbing apparatus for pears, the combination of a succession of means for holding pears with their stem axes in a predetermined direction, bobbing means, means for producing relative movement between the pear holding means and the bobbing means in a direction parallel to the stem axis of the pear, mechanically adjustable means movable relatively to and into contact with the neck of the pear with the end of the neck of the pear projecting beyond said adjustable means and including means for adjustably controlling the extent of relative movement between said holding and bobbing means to determine the position of the cut made through the neck of the pear, and means for moving the bobbing means across the stem axis of the pear while so positioned to bob the pear.

36. An automatic pear bobbing device comprising pear holding means having portions adapted to engage the enlarged part of a pear to hold it with the stem extending in a predetermined direction, complemental pear holding means having portions adapted to engage the flesh of the neck of the pear on opposite sides of the stem axis of the pear, and portions thereof spaced from but relatively adjacent to the base of the stem, means for automatically and relatively moving said complemental pear holding means in a direction axially of the stem axis of the pear, and means for severing the pear neck adjacent the complemental pear holding means.

37. An automatic pear bobbing device comprising pear holding means adapted to engage the enlarged part of the pear to hold it with the stem extending in a predetermined direction, complemental pear holding means adapted to engage the flesh of the neck of the pear and a portion thereof spaced from but relatively adjacent the base of the stem, means for automatically and relatively moving said complemental pear holding means in a direction axially of the stem axis of the pear, and means for severing the pear neck adjacent the complemental pear holding means.

38. A bobbing device for pears, comprising a plurality of means constructed and arranged to engage solely the fleshy portions of a succession of pears, one of said means contacting the enlarged portion of a pear and holding the pear with the stem axis extending in a predetermined direction, and another of said means engaging the flesh of the neck of the pear with the stem projecting naturally, freely and unobstructedly from the pear and beyond said other means, means for successively and automatically providing successively variable distances of travel relatively between said held pear and said second-mentioned means to contact the necks of successive pears with said second-mentioned means, and means for cutting the flesh of the neck of each successive pear adjacent the second-mentioned means including mechanism adjustably positioned by the relative adjusting movement between the held pear and said second-mentioned means for providing a relative movement between the held pear and the cutting means in a direction along the stem axis of the pear.

39. In a bobbing apparatus for pears, the combination of a succession of means for holding the pears with their stem axis in a predetermined direction, bobbing means, means for producing relative movement between the pear holding means and the bobbing means in a direction parallel to the stem axis of the pear, mechanically adjustable means movable relatively to and in contact with the neck of the pear while permitting the stem of the pear to project freely beyond the contacting portion of said adjustable means and including means for adjustably controlling the extent of relative movement between said holding and bobbing means to determine the position of the cut made through the neck of the pear, and means for operating the bobbing means.

40. In a bobbing apparatus for pears, the combination of a rotatable turret having a plurality of pear holding means thereon for holding a succession of pears, one in each holding means, with the stem of the pear extending in a predetermined direction, gauge means, bobbing means, means for moving the gauge means into contact solely with the flesh of the neck of each pear as each holding means on the turret is brought into a predetermined position, the stem of the pear projecting freely beyond said gauge means, means adjustably positioned by movement of the gauge means for positioning the cutting means, and automatic means for operating the cutting means when moved into its shifted position for severing the neck of the pear at such gauged position.

41. An automatic bobbing machine for pears comprising a turret provided with a plurality of spaced apart radially extending arms, pear holding means on each arm adapted to receive a pear and to hold the pear with its stem extending radially of the turret, means to bring each holder with a pear therein to a bobbing station to maintain each holder stationary at said bobbing station and thereafter to move each holder beyond said bobbing station, means at said bobbing station disposed out of the path of movement of each holder adapted to be moved along the stem axis of the pear in the holder and into contact with the neck of each pear, said means moving variable distances of travel in contacting successive pears, said distance of travel being determined by the particular physical outline of the neck of the pear, bobbing means at said station, and mechanical means interconnecting the first-mentioned means and the bobbing means for shifting the bobbing means parallel to the stem axis of the pear variable distances of travel proportionate to the adjusting movement of the first-mentioned means and for positioning the bobbing means to cut variant sized portions from the neck of the successive pears, and means for shifting the first-mentioned means and said bobbing means away from the path of travel of the pear holding means on the turret and for thereafter shifting said turret to bring a successive pear holder to the bobbing station.

42. In an automatic machine for treating pears, the combination of means forming a plurality of fruit holding means, each comprising relatively movable members adapted firmly to hold whole pears therebetween, bobbing means, means for moving said members relatively to cause them to engage the pear while bobbed, means for actuating the bobbing means while said pear is so held, and means for moving said members after the bobbing operation to cause one of said members to disengage from the pear, leaving the other member holding the pear.

43. In combination, supporting means, a guideway mounted thereon and extending in predetermined direction, a first support slidable along said guideway but held from rotation on and relatively to said guideway, spring means for normally urging said first support in one direction along said guideway, a second support carried by and rotatable on said first support, fruit gauging means mounted on said first support, knife bobbing means mounted on said second support, power actuated means to shift the first support longitudinally of the guideway away from its normal position, power actuated means for turning the second support relatively to the first support to cause the bobbing means to swing normally to the plane of movement of said first and second supports, and fruit holding means adapted to position a fruit with its stem axis whereby the gauge means is adapted to contact the flesh of the neck of the fruit and whereby movement of the bobbing means will serve to bob the fruit after engagement of the fruit by the gauging means.

44. In a bobbing mechanism for pears and the like comprising fruit holding means adapted to hold a pear with its stem axis disposed in a predetermined position, means adapted to be projected substantially parallel with the stem axis of the pear to engage the neck of the pear adjacent the base of the stem of the pear, a substantially flat bobbing knife, means to actuate the bobbing knife normally of the stem axis of the pear to bob the pear and to shift the bobbing knife out of contact with the bobbed surface of the pear after the bobbing operation, and means thereafter to shift the bobbing knife and the pear neck engaging means away from the bobbed pear.

45. In a bobbing mechanism for pears, the combination of a first support, a longitudinal guideway stationarily mounted thereon, a first sleeve slidably splined to said guideway, a spring normally urging said sleeve outwardly of said guideway, said first sleeve having means carried thereby adapted to engage the flesh of the neck of the pear adjacent but removed from the base of the stem of the pear, leaving the stem of the pear projecting freely beyond said engaging means, a second sleeve rotatably mounted on and carried by said first sleeve, a bobbing knife carried by said second sleeve, said second sleeve having a furcation, a toothed rotary element rotatable on said longitudinal guideway and having a projection adapted to enter the furcation of said second sleeve, spring means for normally urging said second sleeve in a direction to maintain said bobbing knife away from its fruit cutting zone, a power actuated shaft, a cam rotatable with said power actuated shaft, a geared sector on said power actuated shaft and a lost motion driving connection between said cam and said sector, said sector having teeth adapted to engage the teeth of the first mentioned toothed member for operating the same, and a friction roller carried by said second mentioned sleeve and adapted to be engaged by the cam whereby said cam on power actuation is adapted intermittently to urge both of said sleeves longitudinally of the guideway in opposition to the spring pressure normally exerted on said sleeves.

46. In a bobbing mechanism for pears, means for holding a whole pear with its stem axis extending in predetermined direction, supporting means, a pear neck holder carried thereby and a bobbing knife carried thereby, means for moving said supporting means in a direction parallel with the stem axis of the pear to cause the holder to engage the neck of the pear, the bobbing means being positioned in spaced relation to the neck of the pear, and power actuated means for thereafter shifting the bobbing knife at right angles to the stem axis of the pear to bob the pear, including means for thereafter causing the bobbing knife resiliently to move reversely in its former plane of action out of contact with the cut face of the cut pear, said power actuated means thereafter shifting the supporting means away from the bobbed pear and carrying therewith the neck holder and the bobbing knife.

47. In combination with an intermittently actuated turret, a plurality of fruit holders thereon, each adapted to hold in position a whole fruit at a bobbing station with the stem axis of the fruit extending in predetermined direction, bobbing means at said station adapted to be moved in a direction parallel with the stem axis of the pear, and means for shifting the bobbing means to cause it to move transversely of the stem axis of the pear to bob the pear and thereafter to move in the same plane completely out of contact with the cut face of the pear, and means for thereafter shifting the bobbing means longitudinally of the stem axis of the pear to space the bobbing means away from the bobbed pear whereby to permit subsequent intermittent movement of the turret.

MARK EWALD.